United States Patent [19]
McCorkle

[11] Patent Number: 5,847,677
[45] Date of Patent: Dec. 8, 1998

[54] RANDOM NUMBER GENERATOR FOR JITTERED PULSE REPETITION INTERVAL RADAR SYSTEMS

[75] Inventor: John W. McCorkle, Laurel, Md.

[73] Assignee: The United States of America as represented by the Secretary of the Army, Washington, D.C.

[21] Appl. No.: 888,806

[22] Filed: Jul. 7, 1997

[51] Int. Cl.$^6$ .......................... G01S 13/12; G01S 13/22; G01S 7/282
[52] U.S. Cl. .......................... 342/204; 342/137; 342/202
[58] Field of Search .................................. 342/202, 131, 342/132, 201, 204, 137

[56] References Cited

U.S. PATENT DOCUMENTS 4,049,953  9/1977  Evans, Jr. .................................. 342/137
4,219,817  8/1980  Moore et al. ............................. 342/202

*Primary Examiner*—Ian J. Lobo
*Attorney, Agent, or Firm*—Paul S. Clohan, Jr.

[57] ABSTRACT

A random number generator for generating a pseudo-random code for use with jittered pulse repetition interval radar systems has been disclosed in which the code generated by the random number generator possesses the five attributes desirable for a jittered radar PRI: a flat frequency spectrum, a nearly perfect spike for an autocorrelation function, a controllable absolute minimum and maximum interval, long sequences that do not repeat, and a reasonable average pulse rate. A method for analyzing the autocorrelation properties of the code generated by the random number generator is also disclosed. A means to generate a pulse signal with random pulse repetition jitter has been disclosed.

4 Claims, 8 Drawing Sheets

5,847,677

RANDOM NUMBER GENERATOR FOR JITTERED PULSE REPETITION INTERVAL RADAR SYSTEMS

BACKGROUND OF THE INVENTION

The present invention relates generally to a random number generator for generating a random sequence of numbers. More particularly, the present invention relates to a random number generator for generating a random sequence of numbers for use in jittered pulse repetition interval (PRI) radar systems.

In high pulse repetition frequency (PRF) radar systems, the maximum unambiguous range is short. In order to determine that a target is in the second, third or whatever ambiguous zone, multiple pulse repetition frequencies are used. For purposes of this application, instead of referring to a pulse repetition frequency, the more precise term of a pulse repetition interval code, for use in radar, will be utilized.

In developing a pulse repetition interval code that works well in a radar application, there are five attributes which are desired. The first attribute is a timing code with a flat frequency spectrum. In other words, if a series of unit impulse functions is broadcast according to the PRI code, then any receiver or spectrum analyzer would see the noise floor rise but would not identify any "tones" or sinusoids in the signal. The second desired attribute is a timing code with a perfect spike for an autocorrelation function. In radar terms, it is desired not to have any integration of range-ambiguous (multiple time around) echoes.

The third attribute desired is to be able to generate timing codes having controllable or finite absolute minimums and maximums. Such a feature is important since hardware limits in practical radars must be managed. The fourth attribute is that the code does not repeat for long periods of time. This feature is important to a radar which operates either covertly or in the presence of intelligent jamming. The fifth and last attribute is to have a timing code that, in addition to having the first four attributes, also maximizes the average pulse rate. Such a feature is important to radar designers since the average pulse rate dictates the peak-to-average power ratio. Since most known radars are peak power limited, the average pulse rate usually relates directly to the average radar power.

As described herein, a radar pulse is assumed to be a delta function or unit impulse (sometimes called "the sampling function") and is generally denoted as $\delta(t)$. The radar signal S(t) is thus a series of K impulses. Therefore, the radar signal can be represented as follows:

$$S(t) = \sum_{i=0}^{K-1} \delta(t - t_i) \quad (1)$$

SUMMARY AND OBJECTS OF THE INVENTION

In view of the foregoing, it should be apparent that there still exists a need in the art for a random number generator for jittered PRI radar systems which can be used to increase the maximum unambiguous range of a high PRF radar system. It is, therefore, a primary object of this invention to provide a random number generator for jittered pulse repetition interval radar systems which produces a flat frequency spectrum and a nearly perfect spike for an autocorrelation function.

More particularly, it is an object of this invention to provide a random number generator for jittered pulse repetition radar systems which generates a random code having a controllable absolute minimum and maximum interval, and long sequences that do not repeat.

Still more particularly, it is an object of this invention to provide a random number generator for jittered pulse repetition interval radar systems in which the random code has a reasonable average pulse rate.

Briefly described, these and other objects of the invention are accomplished by providing a pulse repetition frequency or interval code which has a different duration interval between any pair of pulses. The sequence of the code is ordered such that there is almost no ambiguity. For example, out of 1,000 pulses generated, the same range bin will add 1,000 times only at one point in space and all other points in space will add at most, only two times, but usually either zero or one time.

The random number generator of the present invention also generates a code that can be made arbitrarily long and need not be restricted in any way. For example, the length of the code need not be a power of 2. Thus, when used with jittered pulse repetition interval radar systems, such a code generated by the random number generator of the present invention serves to extend the unambiguous range, to spread the radar spectrum so that there are no "PRF lines" and to provide a large variety of codes. The variety of codes makes it difficult for an enemy to anticipate the waveform so that deceptive jamming can be used. The spectrum spreading makes it harder to detect and identify the radar. The present invention achieves a performance improvement for the radar by extending the unambiguous range.

With these and other objects, advantages and features of the invention that may become hereinafter apparent, the nature of the invention may be more clearly understood by reference to the following detailed description of the invention, the appended claims and to the several drawings herein.

DETAILED DESCRIPTION OF THE PREFERRED EMBODIMENT

Figure 1:
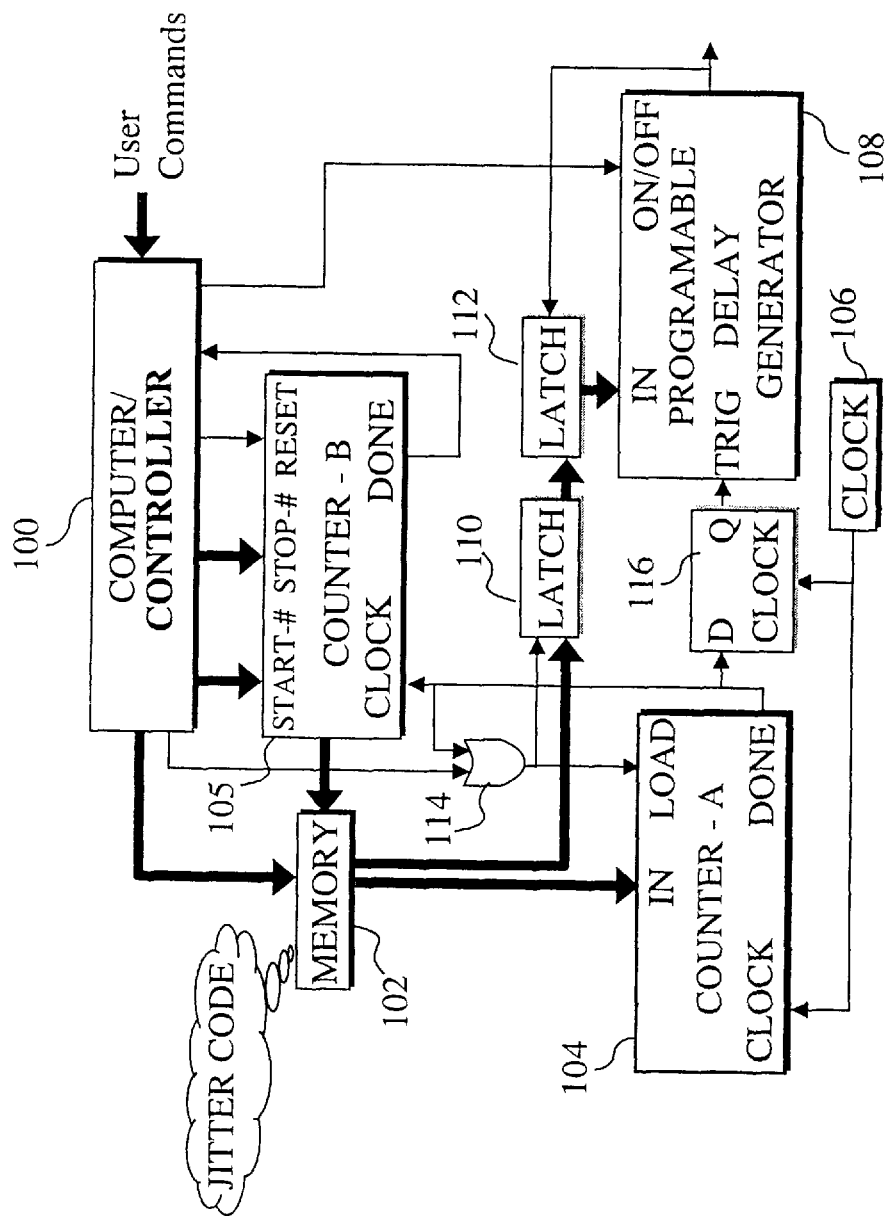
FIG. 1 is a block diagram showing the apparatus used with the present invention.

Referring now in detail to the drawings, FIG. 1 shows a schematic block diagram of the hardware used to implement the present invention. First, a signal $f(t)$ is defined to be a summation of sine waves of random frequencies and random phrases. That is:

$$f(t) = \sum_{i=1}^{M} \sin(2\pi f_i t + \theta_i) \quad (2)$$

where $0 < \theta_i < 360$ degrees uniformly random, and where $f_{low} < f_i < f_{hi}$ uniformly random.

Next, the positive-slope zero-crossings of f(t) were found and became the code. Then $f_{low}$ and $f_{hi}$ were chosen, such that the minimum and maximum intervals can be controlled.

As implemented in hardware as shown in FIG. 1, the code numbers or Jitter Code corresponding to the zero-crossings of the signal $f(t)$ are stored in an memory 102. Memory 102 can be ROM (read only memory) or PROM (programmable read only memory) or EPROM (erasable programmable read only memory), in which case a finite number of codes would be pre-computed and stored. Memory 102 can also be RAM (random access memory) or EEPROM (electronically erasable programmable memory) in which case the code could be dynamically computed in computer/controller 100 such that it is constantly changing. Counter 105 generates an address, or index i, that drives Memory 102 to produce an output $N_i$. The output $N_i$ of Memory 102, is split into two groups, the higher bits $H(N_i)$ and lower bits $L(N_i)$. The higher bits $H(N_i)$ drive a first counter 104 operating at $f_{clock}$. The first counter 104 is clocked by a clock 106. Each time counter 104 reaches the terminal count it produces a DONE signal. For example, suppose counter 104 has just finished counting $H(N_I)$. The DONE signal causes four events to occur simultaneously, either directly, or via or-gate 114. When the next DONE signal occurs, counter 104 loads the new PRI number $H(N_{I+1})$, from the Memory 102; first latch 110 loads the new PRI number $L(N_{I+1})$, (note second latch 112 still contains $L(N_I)$); a trigger pulse is sent to a programmable delay generator 108 one clock cycle latter, via D-flip-flop 116; and second counter 105 is toggled such that the index is incremented from i+1 to i+2 so that the next PRI number $H(N_{i+2})$ and $L(N_{i+2})$ is then ready to be loaded by the first counter 104 and the latch 110 when the next DONE signal occurs. The first counter 104 then counts to $H(N_i)$, which takes $H(N_i)*T$ seconds, where T is the period of the clock 106.

The programmable delay generator 108, which may be a p-bit programmable delay circuit, receives $L(N_i)$the from the latch 112 and subdivides the time period T by $2^p$ such that the total period is:

$$\frac{T}{2^p} (2^p \cdot H(N_i) + L(N_i)) \quad (3)$$

The output of delay generator 108 occurs between 1 and 2 clock cycles after the DONE signal from first counter 104. Latch 112 is toggled by the output of delay generator 108 such that it loads the contents of latch 110, which, at this point in time, contains the next $L(N_{I+1})$. Thus latch 112 now provides delay generator 108 the correct jittered code number for the next pulse. The output pulsed signal with jittered pulse repetition interval is the output of the delay generator 108.

As will be obvious to those of ordinary skill in the art, multiple codes can be stored in the Memory 102 and the computer/controller 100 can select them by choosing the start-# and stop-# for the second counter 105. Thus, when the second counter 105 reaches the stop-#, it reloads the start-# such that the Jitter Code repeats itself in an endless loop unless the computer 100 intervenes or changes the start-# or stop-# numbers, or changes the code. The operation is controlled by computer 100 which is connected to the Memory 102, to the second counter 105, to the programmable delay generator 108, and to the first counter 104 via gate 112.

Figure 5:
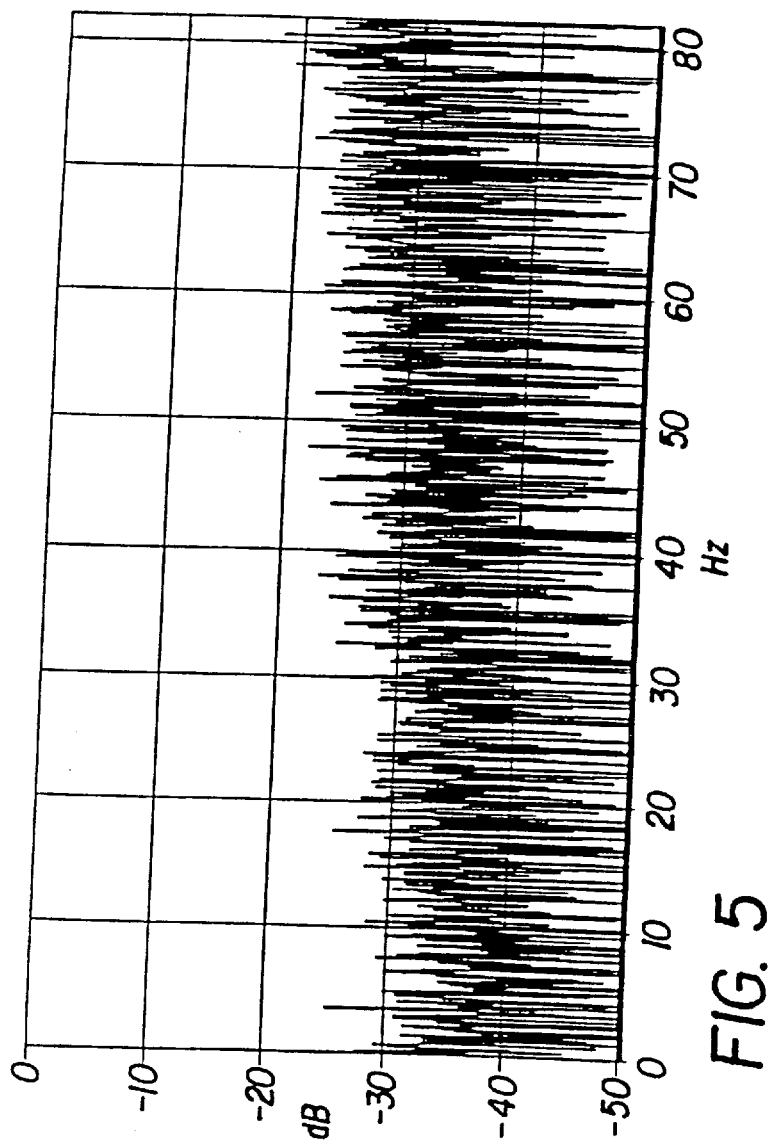
FIG. 5 is a graph showing the frequency response from DC to 80 Hertz of the code generated by the random number generator of the present invention, as in FIG. 4 but using Hamming weighting.
Figure 6:
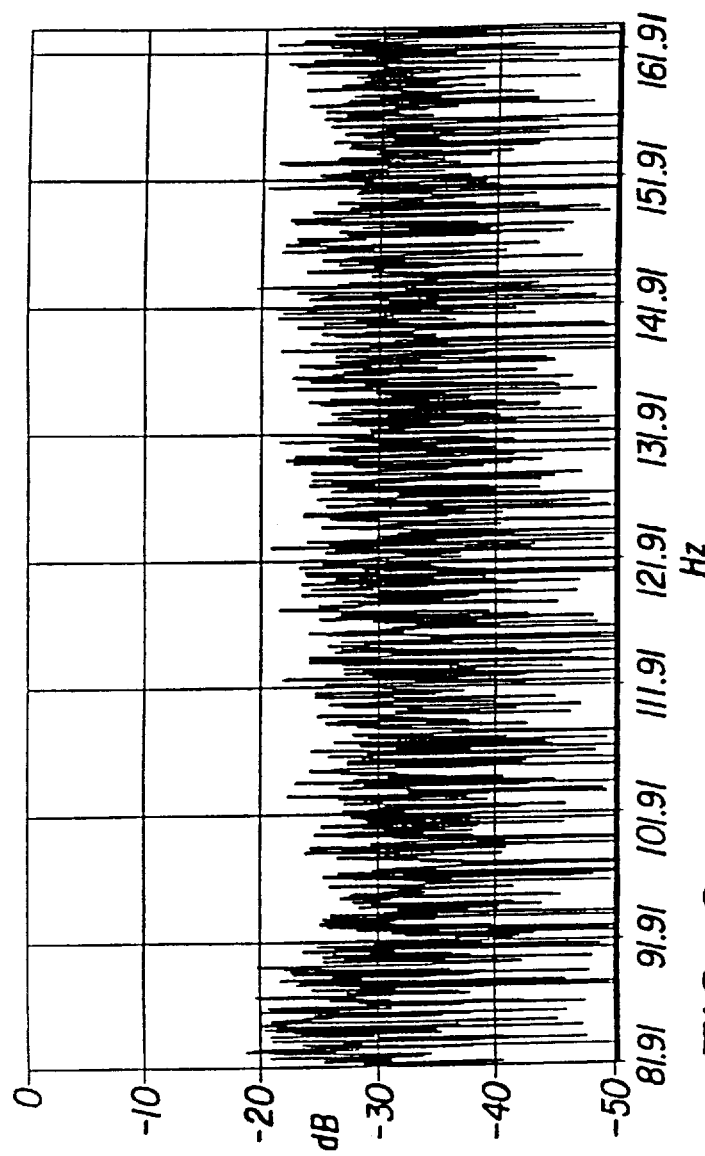
FIG. 6 is a graph showing the frequency response from 80 to 160 Hertz of the code generated by the random number generator of the present invention using Hamming weighting.
Figure 7:
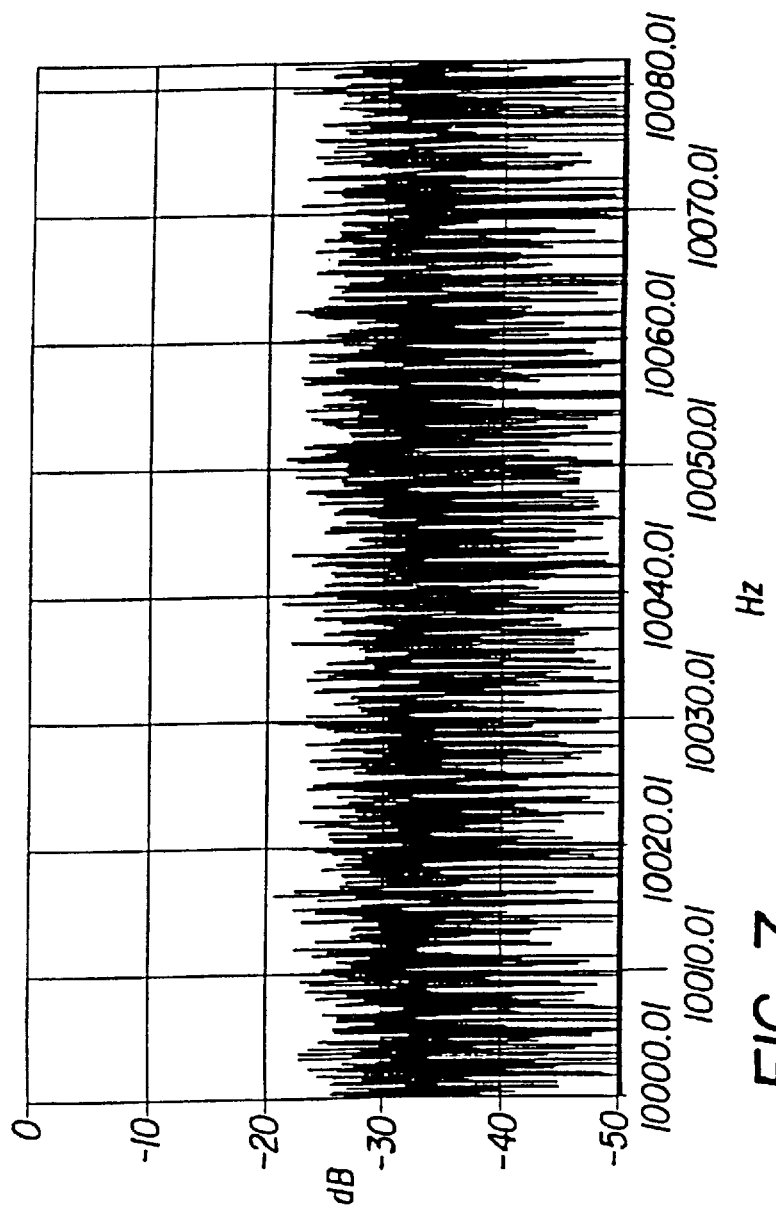
FIG. 7 is a graph showing the frequency response from 10 kilohertz to 10.08 kilohertz of the code generated by the random number generator of the present invention using equal weighting.

An example code generated using the apparatus of FIG. 1 was based on summing 2,700 random frequencies between 0.05 Hz and 90 Hz, and adjusting the zero-crossings to a 40 MHz reference. The first 1,024 zero-crossings were taken and analyzed. The generated code achieved all of the five items on the desired "wish-list" nearly ideally. The code generated by the random number generator of the present invention yields nearly ideal performance in the frequency domain. The power spectrum of a string of delta functions timed according to the code is essentially flat. FIGS. 2–8 provide a detailed look at the spectrum of the code. Simpson-rule integration over an 80 Hz region at 10 kHz, as shown in FIG. 7, produced a −30 dB average energy level relative to DC. Such a level is the preferred optimum level. As is known in the art, an integration of the power in 1,000 pulses should yield a 30-dB gain over a single pulse having equal energy at all frequencies. Thus, all of the delta functions add coherently at the DC level, which is where the peak occurs in FIG. 7. In a radar system, since the receiver is time-locked to the transmitter pulse, each "range-bin" is effectively integrating at a DC level in a sampling sense. Yet, in space, the energy in the sequence of pulses appears to be spread equally over all frequencies, if the integration bandwidth is greater than about 1 Hz.

As expected, therefore, there is lobbing structure shown in FIG. 7 due to the truncation of the sequence. Since there is about 20 seconds between the first and last pulse, there is accordingly a lobbing at a $\frac{1}{20}$ (0.05) Hz interval. If a radar receiver used a 0.05 Hz integration bandwidth, then the lobe structure would come through and some −20 dBc peaks would occur. However, radar ESM equipment is generally not capable of such a narrow bandwidth.

Figure 8:
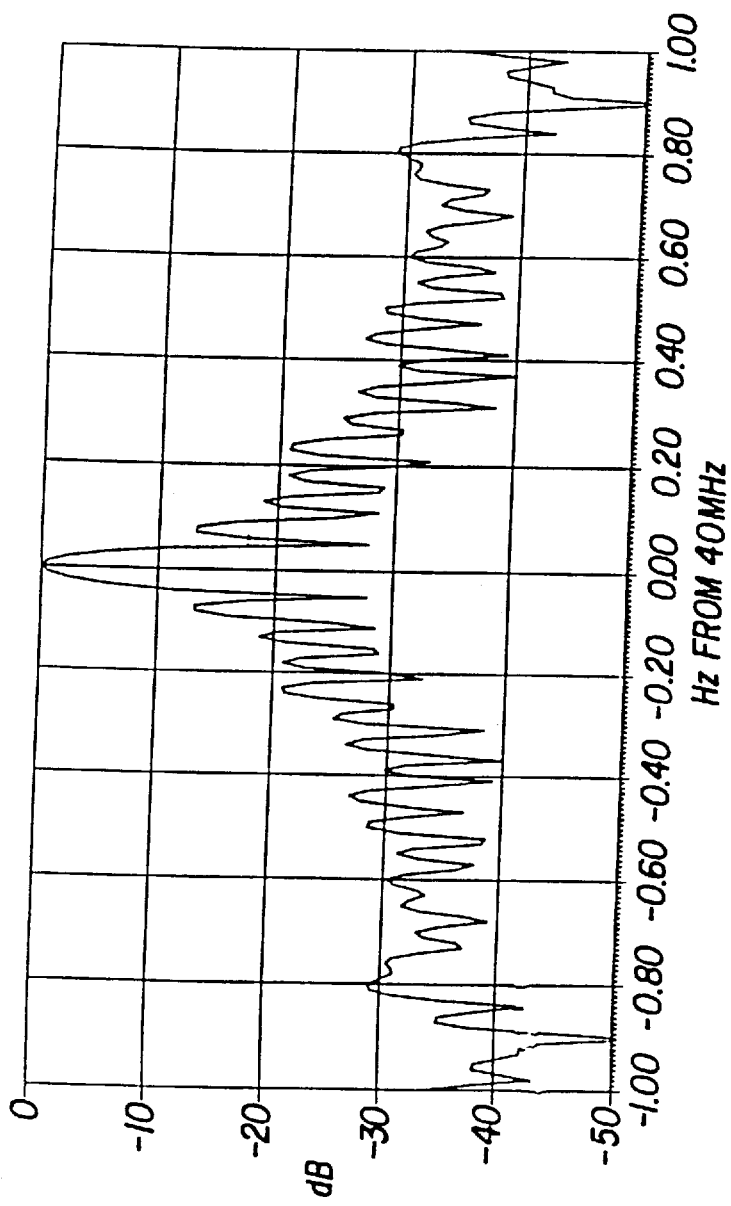
FIG. 8 is a graph showing a frequency response around 40 MHz of the example code generated by the random number generator of the present invention using equal weighting. (Note the pulse times were adjusted to fall on a 40 MHz reference on the example code to illustrate this lobbing).

Since the code generated by the random number generator of the present invention is adjusted fall on increments of dt, a spectral line, or grating lobe, occurs at a frequency of 1/dt and all multiples of it. (FIG. 8 illustrates this grating lobe on the example code, where the code times were adjusted to fall on a 40 MHz reference.) However, most radar systems have a few nano-seconds of random jitter between the time the transmitter is triggered to send a pulse and the time it actually transmits a pulse. This added jitter causes these spectral lines to get spread. It should be noted that, by using a p-bit programmable delay line for the delay generator 108, the spectral lobbing of the resulting signal will not reach a peak until $2^{p}*F_{clock}$ or, for example, 10.24 GHz with a 40 MHz clock and p=8. In this case dt=98 pico-seconds which is easily spread by the nano-second transmitter jitter.

It should also be noted that the first few side lobes of the main lobe can be suppressed by putting an amplitude weighting window, such as Hamming weighting, on the generated pulses. However, the main lobe becomes wider, and the wideband "floor" remains about the same; −30 dBc average and −20 dBc peaks.

Appendix A contains the program code listing for the program PRF which generates random numbers which are used to generate a PRF code for a radar system. The desired output of the random number generator is a sequence of times corresponding to when pulses should be broadcast. As described above, there are five attributes that are desirable for such a pseudo random sequence. They are: (1) flat frequency spectrum; (2) a perfect spike for an auto correlation function; (3) a controllable (finite) absolute minimum and maximum interval between adjacent pulses; (4) an arbitrarily long sequence, that it, does not repeat for long periods of time; and (5) a sequence that maximizes the average pulse rate while meeting the attributes (1)–(4).

Described broadly, the program for generating a PRF code generates a sequence of times in two main steps. First, it creates a signal that is the sum of M sine waves with uniformly random phases between 0 and 360 degrees, and with uniformly random frequencies between $F_{low}$ and $F_{hi}$. Secondly, it finds the positive-slope zero-crossings of that signal. Those zero-crossing times become the PRF code.

In greater detail, the program PRF as set forth in Appendix A does all of the following:

1. Generates random $\omega_i$ radian frequencies and random $\theta_i$ phases and stores them.
2. The signal $f(t)$ is evaluated and t is incremented until one of three things happen:
   a. $f(t_j)<0$ and $f(t_{j+1})>0$, thus indicating a positive-going zero-crossing;
   b. $f'(t_j)>0$ and $f'(t_{j+1})<0$ and both $f(t_j)$ and $f(t_{j+1})<0$, indicating a local peak that might cross zero. In that case, the peak is located by means of the root of the derivative to determine if there is a zero-crossing;
   c. $f'(t_j)<0$ and $f'(t_{j+1})>0$ and both $f(t_j)$ and $f(t_{j+1})>0$, indicating a local dip that might cross zero. In this case, the dip is located to see if there is a zero crossing.
3. Any resulting positive-going zero-crossings are located by means of a root-finder and the program PRF continues step 2 until K+m zero-crossings are found.
4. In order to use the described "digital" implementation, the "analog" code of positive zero crossings is adjusted by moving the pulse times forward or backward to the nearest edge of a $2^{p}*F_{clock}$ reference clock.
5. The autocorrelation is computed and any hits>Q are pruned. If more than m hits must be pruned, then steps 2 & 3 are used to add more points so that output code length is greater than or equal to K. Q is typically set to one or two.

Since it is easy to take derivatives of sums of sine waves, a Newton-Raphson root-finder is preferably used to find the peaks, dips and zero-crossings.

The present invention uses extended precision (80-bit) arithmetic. Since 11 digits are required just to resolve 1 ns in 20 seconds, and as many as 4 bits can be lost in the summation of 2,700 values to yield the signal f(t), a minimum of 15 digits of precision is needed for the calculations. Since 15 digits require a mantissa of 52 bits, a 64-bit floating point (a 53-bits mantissa) is the minimum preferable precision useable for the task.

One of the advantages of the code generation method is that the duration can be made arbitrarily long by choosing the set of $\omega_i$. The K=1,024 point stopping point used in the example code was chosen as an arbitrary value for testing purposes. The code itself continues considerably longer before repeating.

As will be obvious to those of ordinary skill in the art, using the random number generator of the present invention, a code can be made not to repeat during the longest of SAR apertures. Also, the code can be scaled. For example, a low PRF of 11 Hz to 222 Hz, can be compressed to a 22 KHz to 0.444 MHz range. Such a code could, of course, be used for radar pulse compression and would allow groups of 1,024 pulses to be sent at a 100 Hz rate.

The instant invention also allows for an autocorrelation function. The program code listing for the program AUTOCORR is shown in Appendix B. Using the code example discussed above, which was based on summing 2,700 random frequencies between 0.05 Hz and 90 Hz, the autocorrelation function has only 232 sidelobes greater than 1; all of those 232 sidelobes have the value of 2. That level corresponds to –54 dB range-sidelobes. A perfect autocorrelation function would have had all of the 523,776 sidelobes at 1, which would be –60 dB range sidelobes. Thus, the autocorrelation performance of the code is almost ideal.

The AUTOCORR program, the code listing of which shown in Appendix B, will now be described. The AUTOCORR program computes the autocorrelation of the random PRF sequence generated by the PRF program described above. The AUTOCORR program treats that random PRF sequence as a series of impulse or delta functions. It works as follows.

The sequence data generated by the PRF program is read into an array x(i), where x(i) represents the time, in increments of equivalent clock cycles, that the i'th pulse occurs—where i goes from zero to K-1 for K pulses. The first pulse occurs at time t=0 (that is, x(0)=0). Thus, the array contains K numbers {x(0) through x(K-1)} representing the time that each of the delta function occurs. The last pulse occurs at x(K-1)=T.

An "image" array y is then formed such that y(i) equals x(i)–T. Thus y is an array which holds the times where K delta functions occur. The data sequence therefore looks exactly like the sequence in the array "x" except that the last pulse occurs at time =0 that is, y(K-1)=0. All of the other impulses occur at negative times.

The next step is to "shift" y by the smallest increment of time that causes at least one of the delta functions in y to be at nearly the same time as one of the delta functions in x. Then, a count is made of how many "hits" or how many times $|y(i)-x(j)|<\epsilon$ for all i, j. The word "shift" is meant to refer pictorially to the sequence of delta functions being moved together to a different time. For example, suppose that the last pulse in y occurs at time =0 (that is, y(K-1)=0, as it is at the start). Further suppose that it is desired to shift the sequence so that the last pulse occurs at time =$T_{inc}$. Then, it is desired that $y(i)_{new}=y(i)_{old}+T_{inc}$ for all i. The AUTOCORR program accomplishes that by running through a loop for i=0 to K-1 to make $y(i)=y(i)+T_{inc}$. After doing that "shift," the sequence looks the same except that the whole sequence occurs $T_{inc}$ seconds later.

The total time that y has been shifted, "$t_{13}$tot," is first initialized to zero. The AUTOCORR program then starts to loop. The program finds where hits occur and counts them. That means that the program counts how many times $|y(i)-x(j)|<\epsilon$ for all (i, j) ∋ J, where J is the region of overlap between the two sequences. If the number of hits is greater than 1, then the program prints the count and the "$t_{13}$tot" value. The AUTOCORR program then looks for the smallest time shift ($T_{inc}$) on y that will cause another "hit." In other words, a new positive $T_{inc}$ is found by finding the minimum positive value of [x(j)–y(i)] for all (i,j)∋J.

The array y is then shifted by the new $T_{inc}$ and $t_{13}$tot is then incremented by the new $T_{inc}$ in order to keep a running total of the time shift that the array y has experienced. The loop described above is then repeated until "$t_{13}$tot" equals x(K-1), at which point there is a perfect correlation and the autocorrelation is finished.

At the end of the loop, half of the correlation function has been found. However, as is known to those of ordinary skill in the art, by definition, the autocorrelation is symmetrical.

Therefore, there is no need to compute the other side of the autocorrelation function.

It should be noted that an ideal (that is, hits of only 0, 1 or K), one-sided autocorrelation produces $(K^2-K)/2$ "hits" of 1 together with the one perfect hit of K. Since that is 500,000 hits for a 1,024 length code, using only the hits of two or more allows a more reasonable result to be tabulated. For example, only 232 hits were found on the example code generated by the PRF program described above. All 232 of those hits were hits of only 2 pulses.

In order to run the AUTOCORR program even faster, an array a[i] as an index pointer can be used to store a "j" value such that either x(j) or x(j+1) satisfies the steps of finding where the hits occur and counting them and looking for the smallest time shift $T_{inc}$ on the array y that will cause another "hit". In that manner, only a 1 or 2j's need to be tried for each i instead of K j's for each i. Also, the loop can be stopped such that the AUTOCORR program need not count hits at the last step since it is known that the result will always be K.

The two farthest pulses produced in the example PRF code were 90 ms apart (11 Hz) and the closest two were 4.5 ms apart (222 Hz). Those numbers can be modified by changing the $f_{low}$ and $f_{hi}$ (0.05 Hz and 90 Hz) that were used. The average PRF was 51. The random code produced by the PRF program can be very long before repeating by choosing $\omega_i$ to be closely spaced.

A spectral analysis of the generated PRI code was also performed. One way of looking at the spectral analysis problem is to think of the radar receiver as the summing unit of a Finite Impulse Response (FIR) digital filter where the PRI code represents the time-position of the non-zero taps If we let f(t) be a sine wave of some arbitrary phase •, then we have:

$$V_{out} = \sum_{i=0}^{N-1} \sin(2\pi f t_i + \theta) \quad (4)$$

We would then like to know what the biggest output voltage of our FIR filter for any particular • is. That value can easily be found as:

$$V_{out} = \sqrt{\left(\sum_{i=0}^{N-1} \cos(2\pi f t_i)\right)^2 + \left(\sum_{i=0}^{N-1} \sin(2\pi f t_i)\right)^2} \quad (5)$$

Recall that an assumption was made that the received impulse train was summed; in other words, that all the samples were weighted as 1. One could also apply a different weighting, say $W_i$, such as Hamming or Blackman, etc. In that case, the output voltage from a sine wave of arbitrary phase would become:

$$V_{out} = \sqrt{\left(\sum_{i=0}^{N-1} W_i \cos(2\pi f t_i)\right)^2 + \left(\sum_{i=0}^{N-1} W_i \sin(2\pi f t_i)\right)^2} \quad (6)$$

These last two results for Vout are identical to the result of a classical Fourier analysis. Any periodic function with period T (i.e., $f(t+T)=f(t)$) can be represented as a sum of sine waves. That is:

$$f(t) = a_0 + \Sigma(a_k \cos(2\pi k t/T) + b_k \sin(2\pi k t/T)) \quad (8)$$

The summation in Equation 7 is called the Fourier series. The coefficients $a_n$ and $b_n$ are called the Fourier coefficients of $f(t)$ and can be found as:

$$a_k = \frac{2}{T} \int_{-T/2}^{T/2} f(t) \cos\left(\frac{2\pi k}{T} t\right) dt \quad (7)$$

$$b_k = \frac{2}{T} \int_{-T/2}^{T/2} f(t) \sin\left(\frac{2\pi k}{T} t\right) dt$$

$$a_0 = \frac{1}{T} \int_{-T/2}^{T/2} f(t) dt$$

for $k = 1,2,3 \ldots \infty$

Since we have modeled our radar as sending a string of delta functions timed by the PRI code, our transmitted signal is:

$$f(t) = \sum_{i=0}^{N-1} \delta(t - t_i) \quad (8)$$

The Fourier transform is then taken as follows:

$$a_k = \int_{-T/2}^{T/2} \sum_{i=0}^{N-1} \delta(t - t_i) \cos\left(2\pi \frac{k}{T} t\right) dt = \quad (9)$$

$$\sum_{i=0}^{N-1} \cos\left(2\pi \frac{k}{T} t_i\right) = \sum_{i=0}^{N-1} \cos(2\pi f_k t_i)$$

$$b_k = \int_{-T/2}^{T/2} \sum_{i=0}^{N-1} \delta(t - t_i) \sin\left(2\pi \frac{k}{T} t\right) dt =$$

$$\sum_{i=0}^{N-1} \sin\left(2\pi \frac{k}{T} t_i\right) = \sum_{i=0}^{N-1} \sin(2\pi f_k t_i)$$

The amplitude (voltage) of a particular (arbitrary phase) frequency $f_k$ in the signal $f(t)$ is just $\sqrt{a_{k^2} + b_{k^2}}$ where $f_k = k/T$. Note that this equation is identical to the Equation (5) which we derived for $V_{out}$ of the FIR filter.

Typically, it would be desirable to use one of the fast Fourier transform algorithms to calculate a frequency response or power spectrum of the transmitted signal. However, since the FIR taps are spaced at 25 ns increments, and the PRI code lasts about 20 seconds, there are about 800 million taps in the filter. Similarly, the Fourier transform would have to be an 800 million point transform. Clearly, to attempt to do this with the computers available at this time would not be possible.

Figure 2:
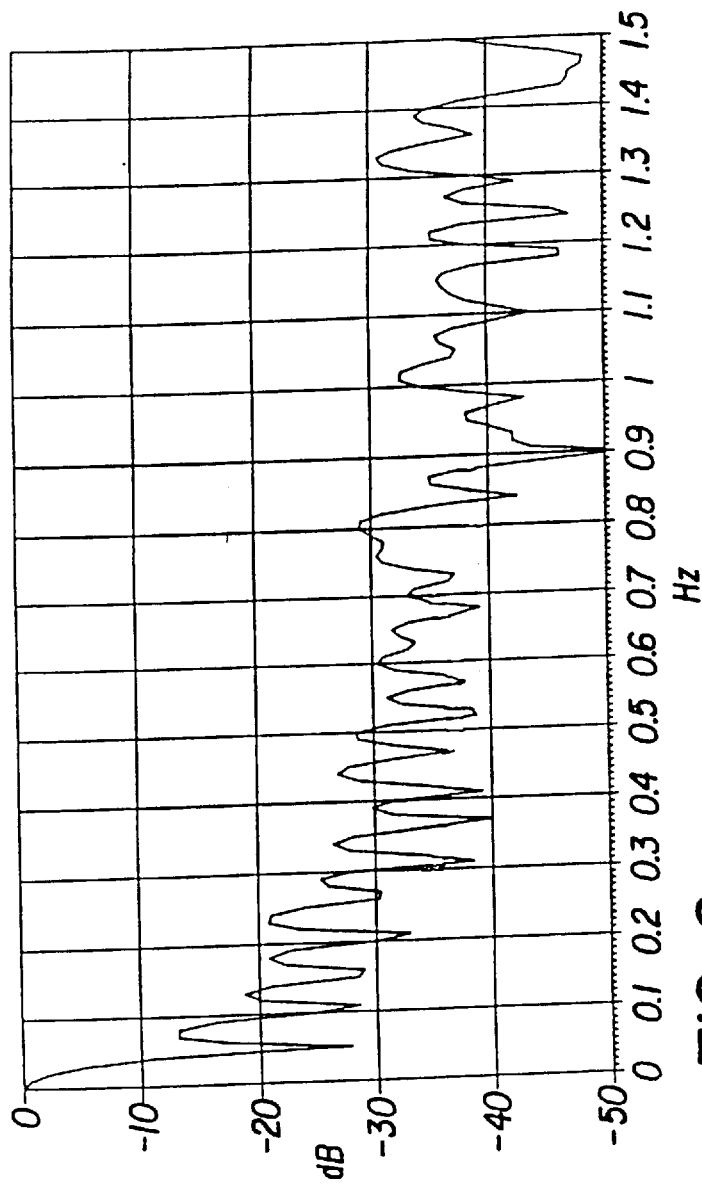
FIG. 2 is a graph showing the frequency response from DC to 1.5 Hertz of an example code generated by the random number generator of the present invention using equal weighing.
Figure 3:
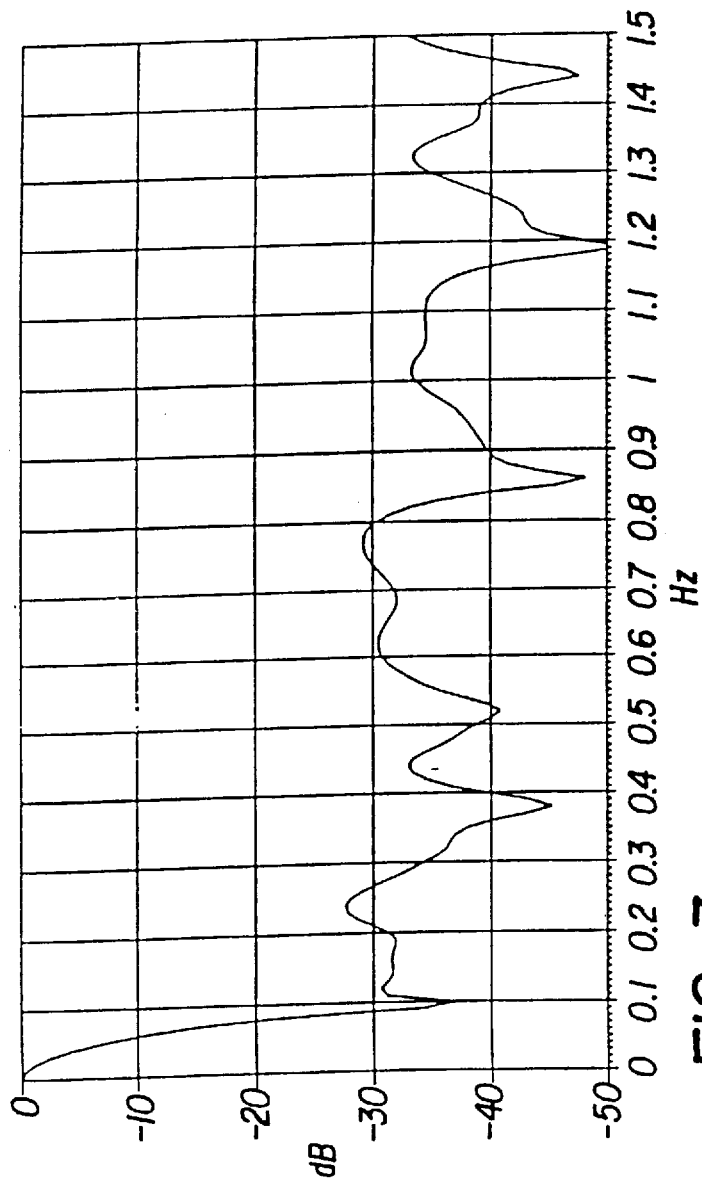
FIG. 3 is a graph showing the frequency response from DC to 1.5 Hertz of the code generated by the random number generator of the present invention as in FIG. 2 but using Hamming weighting.
Figure 4:
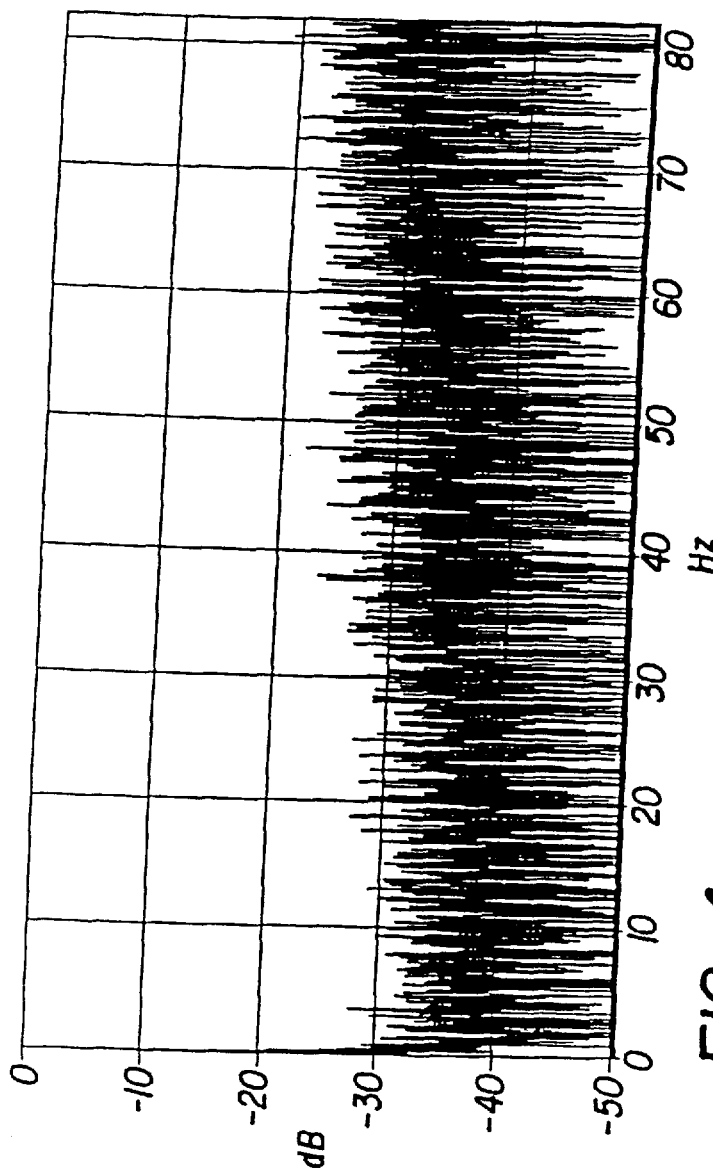
FIG. 4 is a graph showing the frequency response from DC to 80 Hertz of the code generated by the random number generator of the present invention using equal weighting.

Fortunately, solving for all of the 800 million points is not required. A direct summation can be made at a few frequencies to determine how well the PRI code spreads the energy. FIG. 2 is a plot of the frequency response from DC to 1.5 Hz for the case of equal weighting for all pulses. The 0.05 Hz lobbing structure is a result of the 1024 pulse PRI code being about 20 seconds long. FIG. 3 is identical to FIG. 2 except that Hamming weighting was applied to the "taps." It should be noted here that the effect of the Hamming weighting is to null out the first sidelobe, even though a random sampling interval is used instead of the fixed sampling interval. However, the peak and average sidelobe levels farther out are about the same even though the fine structure is different. FIGS. 4 and 5 are similar to FIGS. 2 and 3 except that they go from DC to about 80 Hz. FIG. 6 is also similar with the exception that it goes from about 80 to 160 Hz.

FIG. 7 is a plot from 10 KHz to 10.08 KHz. A Simpson-rule integration was performed on the FIG. 7 data. The result was −30 dBc. In other words, relative to DC where all pulses integrated coherently, producing about 1 watt, the average "Watts-per-Hz" was 30 dB lower, or 0.001 Watts. This result seems appropriate since an impulse spreads its energy across all frequencies equally. Thus, summing 1024 pulses should give 30 dB more energy where they all add up coherently as compared to where they do not coherently add. This data shows that the PRI code effectively spreads the energy quite evenly in the frequency domain.

If the analysis algorithm is correct, then we would expect another main-lobe at 40 MHz since the example PRI code was adjusted to align to the leading edges of a 40 MHz clock. In other words, if the input to our FIR filter was a sine wave at 40 MHz, phased so that the positive going zero-crossings occurred right at the "tap" times, then $V_{out}$=0. But, shift that 40 MHz signal by 90 degrees, and every tap would be at the peak of the sine wave and the signal would look like DC. FIG. 8 is a frequency response plot centered at 40 MHz and clearly shows that the lobe structure is identical to that of FIG. 2.

Although only a preferred embodiment is specifically illustrated and described herein, it will be appreciated that many modifications and variations of the present invention are possible in light of the above teachings and within the purview of the appended claims without departing from the spirit and intended scope of the invention.

I claim:

1. A system for generating a pulsed signal with a jittered pulse repetition interval, comprising:

a) a clock means for generating a clock signal;

b) a memory means for storing a list of numbers comprising a jitter code;

c) a first counter means connected to receive said jitter code number from said memory means, connected also to receive and toggle on said clock signal, connected also to receive a load signal which causes said first counter means to load said jitter code number from said memory means, and having an output that generates a done signal indicating that it has finished counting the said jitter code number previously loaded;

d) an or-gate means connected to receive said done signal from said first counter means, and connected to receive a load-control signal from a digital data processing means, and having an output;

e) a D-flip-flop means connected to toggle on said clock signal, and connected to receive said done signal from said first counter means, and having an output;

f) a first latch means connected to toggle on said output of said or-gate, and connected to receive said jitter code number from said memory means and having an output;

g) a second latch means connected to toggle on a radar trigger signal from a delay generator means, and connected to receive said jitter-code number from said output of said first latch, and having an output;

h) said delay generator means connected to receive said jitter code number from said output of said second latch means, connected to receive a trigger-in signal from said output of said D-flip-flop, and to produce said pulsed signal output, wherein said delay generator means has a predetermined time delay relationship between its trigger-in signal and its output that is proportional to said received jitter code number;

i) a second counter means connected to toggle on said done signal of said first counter means and connected to said memory means such that when said second counter means is toggled, the memory location in said memory means is incremented such that another number from said jitter code is available to both said first counter means and said first latch means; and j) a digital data processor means connected to control said memory means, said second counter means and said delay generator means such that said output pulsed signal has a desirable jittered pulse repetition interval.

2. The system of claim 1, wherein said memory means is a PROM.

3. The system of claim 1, wherein said memory means is a RAM.

4. The system of claim 1 wherein said digital data processor dynamically changes the contents of said memory means.

* * * * *